United States Patent
Malo

(10) Patent No.: US 7,336,872 B1
(45) Date of Patent: Feb. 26, 2008

(54) LOCALIZED ANNEALING OF UV INDUCED INDEX GRATING IN OPTICAL WAVEGUIDES

(75) Inventor: Bernard Y. Malo, Gatineau (CA)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/892,472

(22) Filed: Jun. 28, 2001

(51) Int. Cl.
    *G02B 6/34* (2006.01)
    *G02B 6/02* (2006.01)
    *G02B 6/10* (2006.01)

(52) U.S. Cl. .......... 385/37; 385/123; 385/124; 385/129

(58) Field of Classification Search ......... 385/37, 385/123; 359/566; 65/384
    See application file for complete search history.

(56) References Cited

U.S. PATENT DOCUMENTS

| 5,652,819 | A | * | 7/1997 | Orazi | 385/51 |
| 5,694,502 | A | * | 12/1997 | Byron | 385/37 |
| 5,830,622 | A | * | 11/1998 | Canning et al. | 430/321 |
| 5,930,420 | A | * | 7/1999 | Atkins et al. | 385/37 |
| 5,996,375 | A | * | 12/1999 | Nakai et al. | 65/392 |
| 6,221,566 | B1 | * | 4/2001 | Kohnke et al. | 430/321 |
| 6,222,974 | B1 | * | 4/2001 | Nagata | 385/129 |
| 6,356,681 | B1 | * | 3/2002 | Chen et al. | 385/37 |
| 6,456,762 | B1 | * | 9/2002 | Nishiki et al. | 385/37 |

OTHER PUBLICATIONS

Laser Trimming Method for ADjustment of Grating Offset in Optical Fiber Grating Couplers—Yokota et al—Dept. of Systems Engineering, Faculty of Engineering, Ibaraki University.

* cited by examiner

*Primary Examiner*—Tima M. Wong
(74) *Attorney, Agent, or Firm*—Patterson & Sheridan, LLP

(57) ABSTRACT

A method for producing a Bragg grating in an optical waveguide device such as an optical fiber. The optical fiber is exposed to a UV source through a phase mask and this produces a Bragg grating on the fiber. The grating on the fiber is overexposed such that the gratings are stronger than desired. The fiber is then annealed to stabilize the gratings left behind. The gratings left behind are still stronger than desired. The fiber is then exposed to a point source laser that reduces the index change for selected portions. This trims the existing grating to result in the desired grating strength.

19 Claims, 2 Drawing Sheets

US 7,336,872 B1

LOCALIZED ANNEALING OF UV INDUCED INDEX GRATING IN OPTICAL WAVEGUIDES

FIELD OF THE INVENTION

The present invention relates to optical fibers and, more specifically, to a method and apparatus for creating Bragg gratings in optical fibers.

BACKGROUND OF THE INVENTION

The recent increase in not only the public's interest in but dependance on the Internet and in other forms of telecommunication has led to an explosion of growth in optical technologies.

This growth has produced an unprecedented need for quicker, more efficient methods to produce not only optical fibers but also devices utilizing or based on such fibers. A cornerstone of this technology is the fiber Bragg grating, the basis for a majority of optical signal processing equipments. While producing Bragg gratings in optical fibers is well-known, the techniques for producing fiber cores that utilize these gratings for optical signal processing are labourious and slow.

Typically, an optical waveguide, such as an optical fiber, is exposed to ultra-violet (UV) light through a phase mask. The UV light produces a diffraction pattern that induces a change in the refractive index of selected sections of the fiber. The diffraction pattern produces bands on the fiber core that have a refractive index different from the core's normal refractive index. It is these bands, the spacing between them, length of the banded region, and the periodicity of the bands that allow optical signal processing. Through these bands, collectively known as gratings, optical filters, multiplexers, interferometers, and other processing devices are produced. Unfortunately, the amount of UV exposure determines the stability of the index change. Strong UV exposure produces stable gratings at a given operating temperature while weaker UV exposure produces unstable gratings at the given operating temperature. The unstable gratings tend to become weaker over time.

To overcome this undesirable quality, after exposure to UV light, fibers with gratings imprinted on them are typically annealed. Annealing a fiber involves exposing the fiber to high temperatures, typically by placing the fibers in an oven. The elevated temperatures eliminate the weaker, more unstable bands while the stronger bands survive and are rendered stable at some predetermined temperature. To obtain a specific band pattern or grating, the UV imprinting overexposes to produce a larger index change than what is required. Then, after the annealing, the resulting grating is measured to determine how much of the grating has been erased. Based on this measurement, new UV exposure conditions are calculated so that, after annealing, the desired grating is produced.

The above procedure is clearly unsatisfactory for larger scale manufacturing operations. Its trial and error nature is not only time consuming but also quite expensive in terms of manpower and effort.

Clearly, there is a need for a manufacturing process that avoids the costly and time intensive trial and error method.

SUMMARY OF THE INVENTION

The present invention provides a method for producing Bragg gratings on an optical waveguide device such as an optical fiber. The optical fiber is exposed to a UV source through a phase mask and this produces Bragg gratings on the fiber. The gratings on the fiber are overexposed such that the gratings are stronger than desired. The fiber is then annealed to reduce the index changes and to stabilize the gratings left behind. The gratings are still stronger than desired. The fiber is then exposed to a point source of heat, in the form of a focused laser beam that selectively reduces the index change for selected gratings. This trims the existing gratings to result in the desired grating strength. The wavelength of the laser used for trimming must be such that heat is generated from the irradiation. The final grating strength thus obtained is inherently stable and requires no further annealing.

In a first aspect, the present invention provides a method of producing an increase in the refractive index of a portion of an optical fiber, the method comprising exposing said portion to a UV light source, thereby causing an increase in the refractive index of said portion and exposing a segment of said portion to localized heat, thereby reducing said increase in the refractive index of said segment said heat having sufficient energy to decrease said increase in the refractive index.

In a second aspect, the present invention provides a system for altering an optical waveguide having Bragg gratings induced on a portion thereof to obtain a desired optical signal response, the system comprising:
 means for measuring an optical signal response from said waveguide;
 heating means for heating a localized section of said portion, said heating means being capable of at least partially erasing said Bragg grating from said section by heating said section;
 data processing means for processing data received from said measuring means and for controlling said heating means;

wherein
 if said optical signal response measured by said measuring means is not substantially equal to said desired optical signal response, said data processing means causes said heating means to at least partially reduce the refractive index of sections of said portion until the desired optical signal response is obtained.

In a third aspect, the present invention provides a method of altering an optical waveguide to achieve a desired optical signal response from said waveguide, the method comprising:
 a) inducing a change in refractive index in a portion of said waveguide;
 b) measuring an optical signal response from said waveguide;
 c) heating a localized section of said portion to reduce said change in said section to if said optical signal response is not the desired optical signal response; and
 d) repeating steps b) and c) until the desired optical signal response is achieved.

In a fourth aspect, the present invention provides a method of altering an optical waveguide with a portion having a Bragg grating to achieve a desired optical signal response from said waveguide, the method comprising:
 a) measuring an optical signal response from said waveguide;
 b) heating a localized section of said portion to alter said Bragg grating if said optical signal response is not the desired optical signal response;

c) repeating steps a) and b) until the desired optical signal response is achieved.

DETAILED DESCRIPTION OF THE DRAWINGS

A better understanding of the invention may be obtained by reading the detailed description of the invention below, in conjunction with the following drawings, in which.

DETAILED DESCRIPTION

It should be noted that in this document, the term fiber or optical fiber refers to not only the fiber with its cladding but, more specifically, to the fiber core at the center of the fiber. When referring to changes in the characteristics of the fiber, what is meant are changes in the characteristics of the fiber core.

Figure 1:
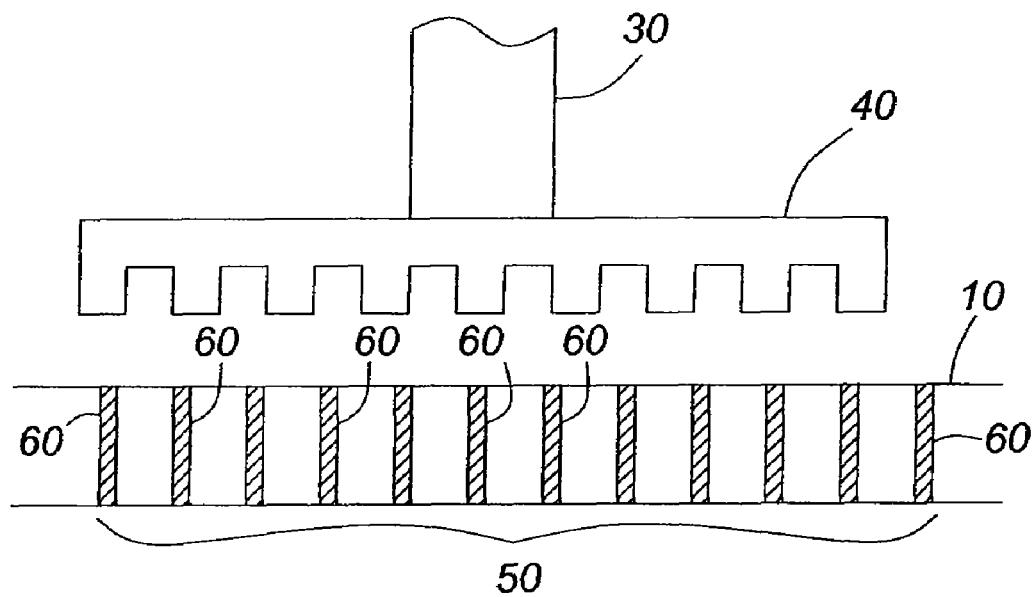
FIG. 1 is a schematic view of UV light imprinting a grating on a fiber.

Referring to FIG. 1, a side schematic view of an optical waveguide, in this case an optical fiber 10, is illustrated. As known in the field, a grating 50 can be induced in the fiber 10 by exposing the fiber 10 to ultraviolet (UV) light 30 through a phase mask 40. To obtain the grating pattern, the UV light is shone through a phase mask 40. The UV exposure induces changes in the refractive index in the affected portions 60 of the fiber 10. The light and dark parts of the portion 50 represent bands where the refractive index has been altered.

Figure 2:
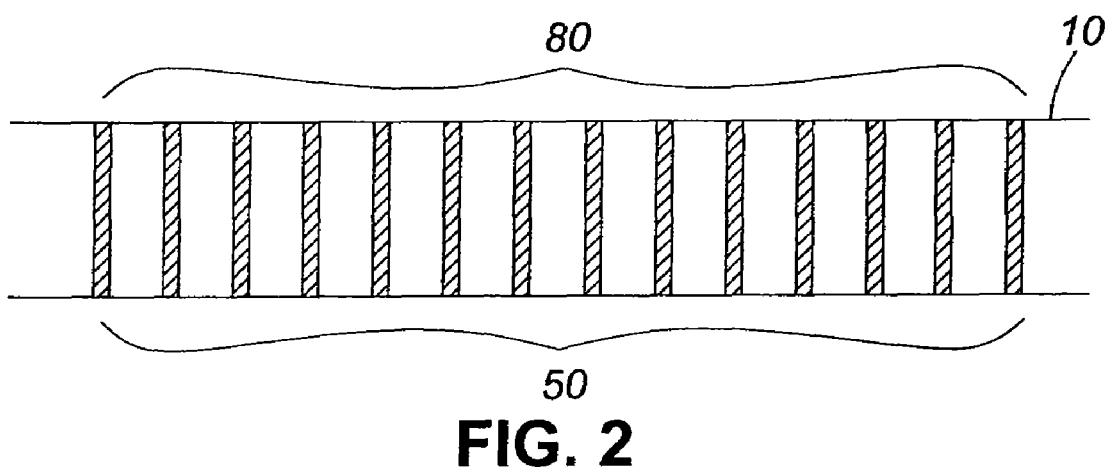
FIG. 2 is a schematic view of the fiber after UV induced changes in refractive index.

After the exposure to UV, the resulting fiber portion 50 (see FIG. 2) will have a grating pattern. Any areas weakly exposed to the UV light will have weakly induced index changes. These index changes may be unstable and may degrade over time for a given temperature. Stabilization is therefore desirable. To stabilize the grating, the fiber 10 can be annealed by placing the fiber 10 into a furnace. This is a standard annealing step known in the field. The resulting fiber (see FIG. 3) will have a region 80 with a stable grating. For annealing, typical temperatures used to stabilize the index change are in the region of 100° C.-300° C.

Figure 3:
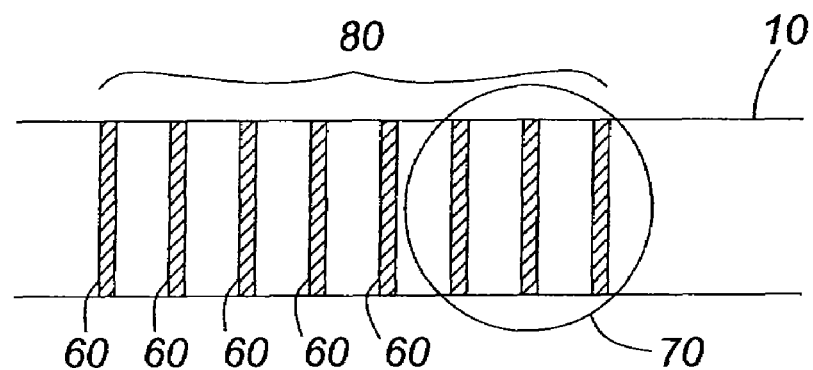
FIG. 3 is a schematic view of the fiber after global annealing.

The index change in the region 80 in FIG. 3 should be greater or higher than desired. That is, if a final refractive index of 1.4511 is required from a fiber having an initial refractive index of 1.45, the UV treatment can change the index to 1.4515. Annealing may reduce the index change to 1.4513. The remaining 0.0002 change required can then be trimmed off the treated fiber. The region can then be trimmed by using a spot sized $CO_2$ laser beam 70 to reduce the index changes in selected bands 60. The $CO_2$ laser is used to lower the induced index of refraction for a section of the region 80.

The $CO_2$ laser erases or reduces the UV induced index of refraction change by heating the exterior of the fiber at the point at which the beam is focused. The heat then travels rapidly into the core of the fiber at the fiber's longitudinal center and reduces the UV induced index of refraction change for the bands in that section. If the $CO_2$ laser beam is maintained long enough or is set at a high enough power setting, the heat delivered to the core of the fiber will erase the UV induced index change. Alternatively, the duration of the $CO_2$ laser along with its intensity can be increased to ensure better reduction of the induced index change. While the term erasure is applied to the reduction of the index change, this does not mean erasure in the sense that the change never occurred. Erasure means the reduction of the index change to such a degree that the index of refraction for the erased area is not significantly different from that of the original index of refraction.

The $CO_2$ laser, or any other source of light whose power is absorbed by the fiber at the surface and which does not increase the induced index in the fiber, can be focused on the relevant area of the fiber to provide heat to the core of the fiber. Ideally, the spot size of the laser is about an order of magnitude smaller than the grating being altered. Since gratings are typically about 10 mm long, a typical laser spot size would be about 1 mm in diameter or less. To be effective the $CO_2$ laser heats the fiber core to a temperature of between 100° C. and 300° C. and this reduces the index change in the affected core region. Since the core was previously annealed and the index change had been stabilized, the resulting trimmed index change is also stable.

Using a $CO_2$ laser, erasing or trimming an index change takes only a few seconds. As an improvement for manufacturing and for better output optical signal response, the output can be continuously monitored while the erasure or trimming of the grating is being accomplished. Thus, by monitoring the output response while the grating is being trimmed, the desired output response will be easier to achieve.

Figure 4:
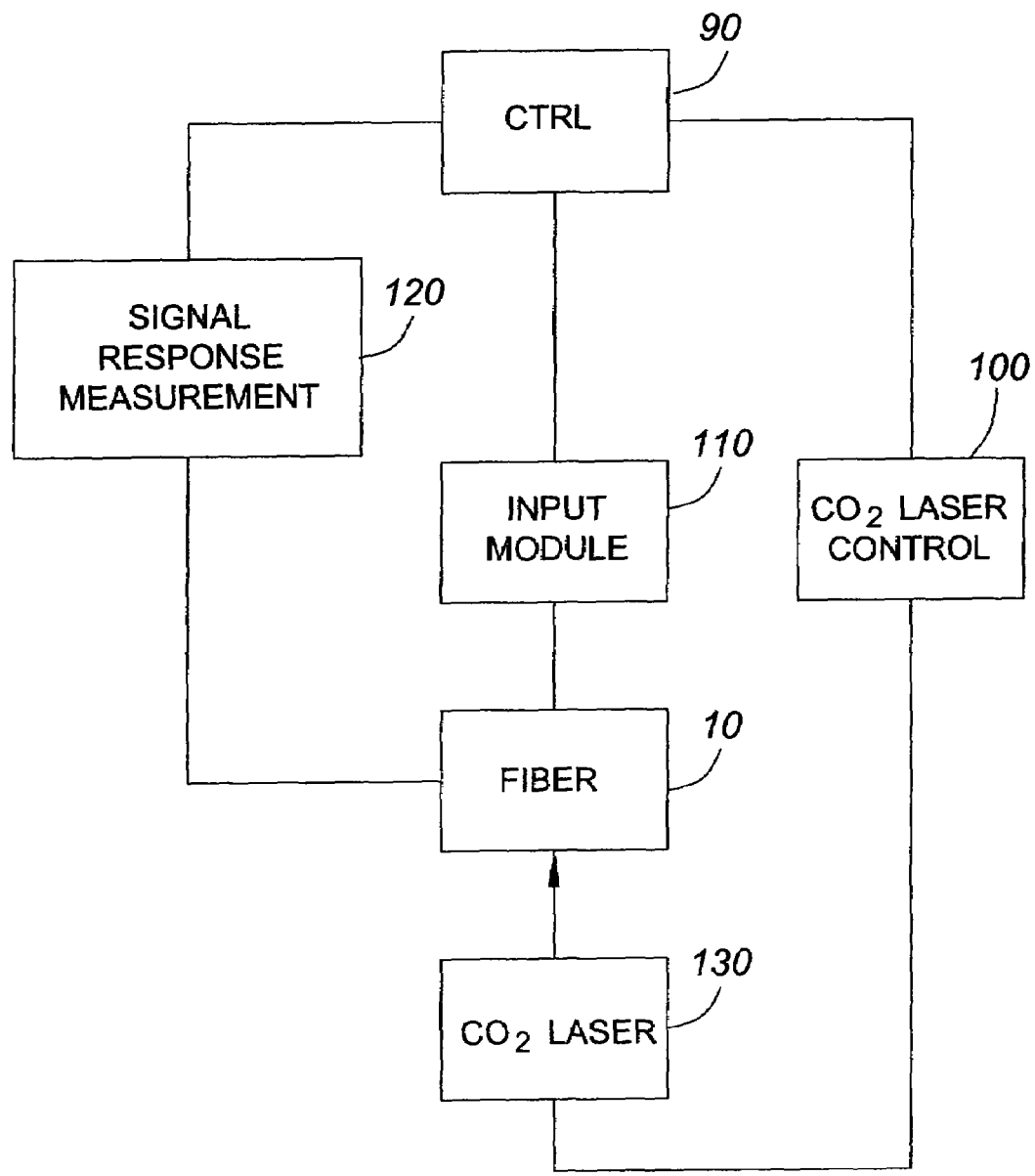
FIG. 4 is a block diagram of a system for automated grating trimming.

FIG. 4 is a block diagram of the components of a system that can automate the process. A general control module 90 communicates with a $CO_2$ laser control module 100. The general control module 90 controls the $CO_2$ laser control 100 and receives input from the signal measurement module 120 while controlling the input signal module 110. The input signal module 110 sends an input signal to the fiber 10. This input signal is processed by the fiber 10 and the output is measured by the signal response measurement module 120. The response is transmitted to the general control module 90 which, depending on the response, sends appropriate commands to the $CO_2$ laser control 100.

The $CO_2$ laser 100 control in turn controls the $CO_2$ laser 130. Depending on the commands received from the general control module 90, the $CO_2$ laser control 100 can increase or decrease the power of and activate or deactivate the $CO_2$ laser. Furthermore, the position of the beam of the $CO_2$ laser can also be controlled so that the beam can be focused on a particular spot on the fiber or the beam can be swept across the fiber at controlled rates to provide uniform heat to the fiber. Alternatively, the laser can be held stationary while the fiber is moved past the beam. Either way, the translation of the focusing spot on the fiber by moving either the fiber or the laser, can be used to provide uniform heat to the fiber or to move the focusing spot to the relevant portion of the fiber. The feedback structure of the system allows for real-time control of the fiber annealing. A specific or desired signal response characteristic can then be programmed into the control module 90 and, by having it monitor the output signal response and by having it trim or alter the grating on the fiber 10 until the desired response is achieved, greater accuracy in fiber fabrication can be had.

Fine trimming of the index change can be realized by scanning the $CO_2$ laser beam along the length of the grating at variable speed while monitoring the response of the device. This is especially true for chirped gratings like gain flattening filters (GFF) where the local resonance of the grating corresponds to a unique wavelength. In this way controlled erasing of a local index change is possible because only a small portion of the grating response changes as a result of the processing.

It should be noted that the fiber 10 in FIG. 4 is ideally a fiber with stabilized gratings already imprinted on it. The system in FIG. 4 is ideally suited for final trimming or fine tuning of the fiber. However, the system can also be used for the initial annealing step by having the $CO_2$ laser anneal the whole fiber, an effective albeit time consuming procedure.

It should also be noted that for the grating trimming explained above to be effective, the grating previously imprinted on the fiber must be greater than what is desired. The trimming technique explained above can trim or reduce the grating but not add to it. Thus, a grating with an index of 1.4510 can be reduced to an index of 1.4508 but it cannot be increased to 1.4512.

A person understanding the above-described invention may now conceive of alternative designs, using the principles described herein. All such designs which fall within the scope of the claims appended hereto are considered to be part of the present invention.

I claim:

1. A method of altering an optical waveguide to achieve a desired optical signal response from said waveguide, the method comprising:
    a) inducing an increase in refractive index in a portion of said waveguide;
    b) measuring an optical signal response from said waveguide;
    c) heating a localized section of said portion to reduce said increase in said section if said optical signal response is not the desired optical signal response; and
    d) repeating steps b) and c) until the desired optical signal response is achieved.

2. The method as in claim 1, wherein said heating is accomplished by using light which is absorbed at a surface of said waveguide to produce localized heat.

3. The method as in claim 1, farther including heating at least said portion to stabilize said change prior to step b).

4. The method as in claim 1, wherein said heating is accomplished by using a laser.

5. The method as in claim 1, wherein said heating is accomplished by using a $CO_2$ laser.

6. The method as in claim 1, wherein said inducing is accomplished by using a UV light source.

7. The method as in claim 6, further including placing a phase mask between said UV light source and said waveguide to produce a grating in said portion of said waveguide.

8. A system for altering an optical waveguide to achieve a desired optical signal response from said waveguide, the system comprising:
    a member configured to induce an increase in refractive index in a portion of said waveguide;
    a measurement member configured to measure an optical signal response from said waveguide; and
    a heat member configured to heat a localized section of said portion to reduce said increase in said section if said optical signal response is not the desired optical signal response.

9. The system as in claim 8, wherein said heat member comprises a light which is absorbed at a surface of said waveguide to produce localized heat.

10. The system as in claim 8, further including a heating system configured to stabilize said increase in the refractive index.

11. The system as in claim 8, wherein said heat member is a laser.

12. The system as in claim 8, wherein said heat member is a $CO_2$ laser.

13. The system as in claim 8, wherein said member configured to induce an increase in refractive index in a portion of said waveguide is a UV light source.

14. The system as in claim 13, wherein a phase mask is positioned between said UV light source and said waveguide to produce a grating in said portion of said waveguide.

15. A method of altering an optical waveguide to achieve a desired optical signal response from said waveguide, the method comprising:
    inducing an increase in refractive index in a portion of said waveguide;
    measuring an optical signal response from said waveguide to determine if said optical signal response is the desired optical signal response;
    heating a localized section of said portion to reduce said increase in said section in response to said measuring the optical signal response;
    measuring a further optical signal response from said waveguide; and
    heating a localized section of said portion to reduce said increase in said section in response to said measuring the further optical signal response if said further optical signal response is not the desired optical signal response.

16. The method as in claim 15, wherein a laser provides said heating.

17. The method as in claim 15, wherein a $CO_2$ laser provides said heating.

18. The method as in claim 15, wherein a UV light source provides said inducing.

19. The method as in claim 15, wherein a light which is absorbed at a surface of said waveguide to produce localized heat during said heating.

* * * * *